(12) United States Patent
Karaoguz et al.

(10) Patent No.: US 9,066,220 B2
(45) Date of Patent: *Jun. 23, 2015

(54) METHOD AND SYSTEM FOR DISTRIBUTED INFRASTRUCTURE FOR STREAMING DATA VIA MULTIPLE ACCESS POINTS

(71) Applicant: BROADCOM CORPORATION, Irvine, CA (US)

(72) Inventors: Jeyhan Karaoguz, Irvine, CA (US); Hooman Honary, Newport Coast, CA (US); Nambirajan Seshadri, Irvine, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 13/846,776

(22) Filed: Mar. 18, 2013

(65) Prior Publication Data
US 2013/0212218 A1 Aug. 15, 2013

Related U.S. Application Data

(63) Continuation of application No. 13/596,712, filed on Aug. 28, 2012, now Pat. No. 8,402,159, which is a continuation of application No. 13/404,554, filed on Feb. 24, 2012, now Pat. No. 8,255,558, which is a continuation of application No. 11/536,325, filed on Sep. 28, 2006, now Pat. No. 8,126,983.

(51) Int. Cl.
| | |
|---|---|
| G06F 15/16 | (2006.01) |
| H04W 8/22 | (2009.01) |
| H04L 1/00 | (2006.01) |
| H04L 29/06 | (2006.01) |
| H04L 29/08 | (2006.01) |

(52) U.S. Cl.
CPC .............. *H04W 8/22* (2013.01); *H04L 1/0003* (2013.01); *H04L 1/0009* (2013.01); *H04L 2001/0092* (2013.01); *H04L 65/601* (2013.01); *H04L 65/4092* (2013.01); *H04L 65/80* (2013.01); *H04L 67/04* (2013.01); *H04L 69/14* (2013.01)

(58) Field of Classification Search
CPC ... H04L 1/0003; H04L 1/0009; H04L 65/601; H04L 65/4092; H04L 67/04; H04L 69/14; H04W 8/22
USPC .................................................. 709/217, 231
See application file for complete search history.

(56) References Cited

U.S. PATENT DOCUMENTS

| | | | | |
|---|---|---|---|---|
| 6,317,854 | B1 * | 11/2001 | Watanabe | 714/749 |
| 2005/0129058 | A1 * | 6/2005 | Casaccia et al. | 370/464 |
| 2007/0201540 | A1 * | 8/2007 | Berkman | 375/219 |

*Primary Examiner* — David X Yi
(74) *Attorney, Agent, or Firm* — Garlick & Markison; Bruce E. Garlick

(57) ABSTRACT

Methods and systems for distributed infrastructure for streaming data via multiple access points. Aspects of one method may include apportioning multimedia information among a plurality of transmitting devices based on feedback channel information received from a destination receiving device by, for example, a transmission controller device. The transmitting devices may transmit the multimedia information to the destination receiving device. A transmitting device that may not be apportioned multimedia information may transmit a probing signal. The destination receiving device may generate feedback channel information for a transmitting device, for example, based on the multimedia information or the probing signal received from the respective transmitting device. The apportioning of the multimedia information may be dynamically adjusted based on updated feedback channel information received from the destination receiving device.

20 Claims, 8 Drawing Sheets

METHOD AND SYSTEM FOR DISTRIBUTED INFRASTRUCTURE FOR STREAMING DATA VIA MULTIPLE ACCESS POINTS

CROSS REFERENCE TO RELATED PATENTS/PATENT APPLICATIONS

The present U.S. Utility Patent Application claims priority under 35 U.S.C. §120, as a continuation of U.S. Utility patent application Ser. No. 13/596,712, filed Aug. 28, 2012, issuing as U.S. Pat. No. 8,402,159, which is incorporated herein by reference in its entirety for all purposes.

The Ser. No. 13/596,712 application claims priority under 35 U.S.C. §120, as a continuation of U.S. Utility patent application Ser. No. 13/404,554, filed Feb. 24, 2012, now U.S. Pat. No. 8,255,558, which is incorporated herein by reference in its entirety for all purposes.

The Ser. No. 13/404,554 application claims priority under 35 U.S.C. §120, as a continuation of U.S. Utility patent application Ser. No. 11/536,325, filed Sep. 28, 2006, now U.S. Pat. No. 8,126,983, which is incorporated herein by reference in its entirety for all purposes.

The Ser. No. 11/536,325 application is related to:
U.S. patent application Ser. No. 11/492,667 filed on Jul. 25, 2006;
U.S. patent application Ser. No. 11/492,391 filed on Jul. 25, 2006;
U.S. patent application Ser. No. 11/492,721 filed on Jul. 25, 2006;
U.S. patent application Ser. No. 11/492,381 filed on Jul. 25, 2006; and
U.S. patent application Ser. No. 11/492,390 filed on Jul. 25, 2006; in which each of the above stated applications is incorporated herein by reference in its entirety.

FIELD OF THE INVENTION

Certain embodiments of the invention relate to transmitting multimedia information. More specifically, certain embodiments of the invention relate to a method and system for distributed infrastructure for streaming data via multiple access points.

BACKGROUND OF THE INVENTION

Transmission in various portions of the RF spectrum may be regulated by, for example, the FCC in the United States, and similar agencies in other countries. For example, in the United States a television station may be allocated a channel with a 6-MHz bandwidth in which to transmit their signals. The FCC may have regulations limiting the amount of signal leakage beyond the 6 MHz bandwidth. The FCC may also refrain from allocating adjacent channels within a geographic area in order to provide further buffering against interference. For example, in the Chicago metropolitan area, the FCC allocated channels 5 and 7, but not channel 6. Accordingly, there may be a 6-MHz buffer between the channels 5 and 7. This ensures that interference from other television stations may be reduced. Additionally, the FCC may limit transmission power by a television station. In this way, a local television station may be protected from interference by an adjacent channel in a neighboring city or from the same channel in a distant city.

Some technologies, such as those based on CDMA technology in mobile communications, may allow a plurality of transmitters to transmit in the same bandwidth. However, the use of the bandwidth may be under control of a single entity, and that entity may regulate transmission to reduce interference. For example, a base station may control transmission power levels for each transmitter, or mobile terminal, in a cellular area so that the received power level for each mobile terminal at the base station may be approximately the same. Otherwise, if a rogue mobile terminal transmits at a much higher power level than requested by the base station, the base station may not be able to correctly receive and demodulate signals transmitted by the other mobile terminals.

However, with respect to unregulated RF spectra, such as the 2.4 GHz spectrum shared by Bluetooth devices, WiFi devices, and 2.4 GHz cordless phones, there may not be coordination to reduce interference among devices using the same spectrum. Other devices, such as a microwave oven, may also transmit signals in the 2.4 GHz spectrum that may interfere with the communication devices. If Bluetooth and WiFi devices are being used to transmit data, the effect may be to reduce data throughput due to retransmission of data packets. However, in cases where re-transmission is not supported, for example, voice-over-IP (VoIP), the effect of the interference may result in losing portions of conversation. Similarly, streaming audio and/or video may be affected by interference from other transmission sources.

Further limitations and disadvantages of conventional and traditional approaches will become apparent to one of skill in the art, through comparison of such systems with some aspects of the present invention as set forth in the remainder of the present application with reference to the drawings.

SUMMARY OF THE INVENTION

A system and/or method for distributed infrastructure for streaming data via multiple access points, substantially as shown in and/or described in connection with at least one of the figures, as set forth more completely in the claims. Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for distributed infrastructure for streaming data via multiple access points. Aspects of the method may comprise apportioning multimedia information among a plurality of transmitting devices based on feedback channel information received from a destination receiving device by, for example, a transmission controller device. The transmission controller device may be, for example, integrated into one of the transmitting devices. The transmitting devices may transmit the apportioned multimedia information to the destination receiving device. A transmitting device that may not be apportioned multimedia information may transmit a probing signal. The destination receiving device may generate feedback channel information for a transmitting device, for example, based on the multimedia information or the probing signal received from the respective transmitting device. The apportioning of the multimedia information may be dynamically adjusted based on updated feedback channel information received from the destination receiving device. The multimedia information may comprise video information, audio information, and/or data. The data in the multimedia information may comprise, for example, web site information or computer related files, such as, word processing documents or even executable programs being transferred.

Figure 1A:
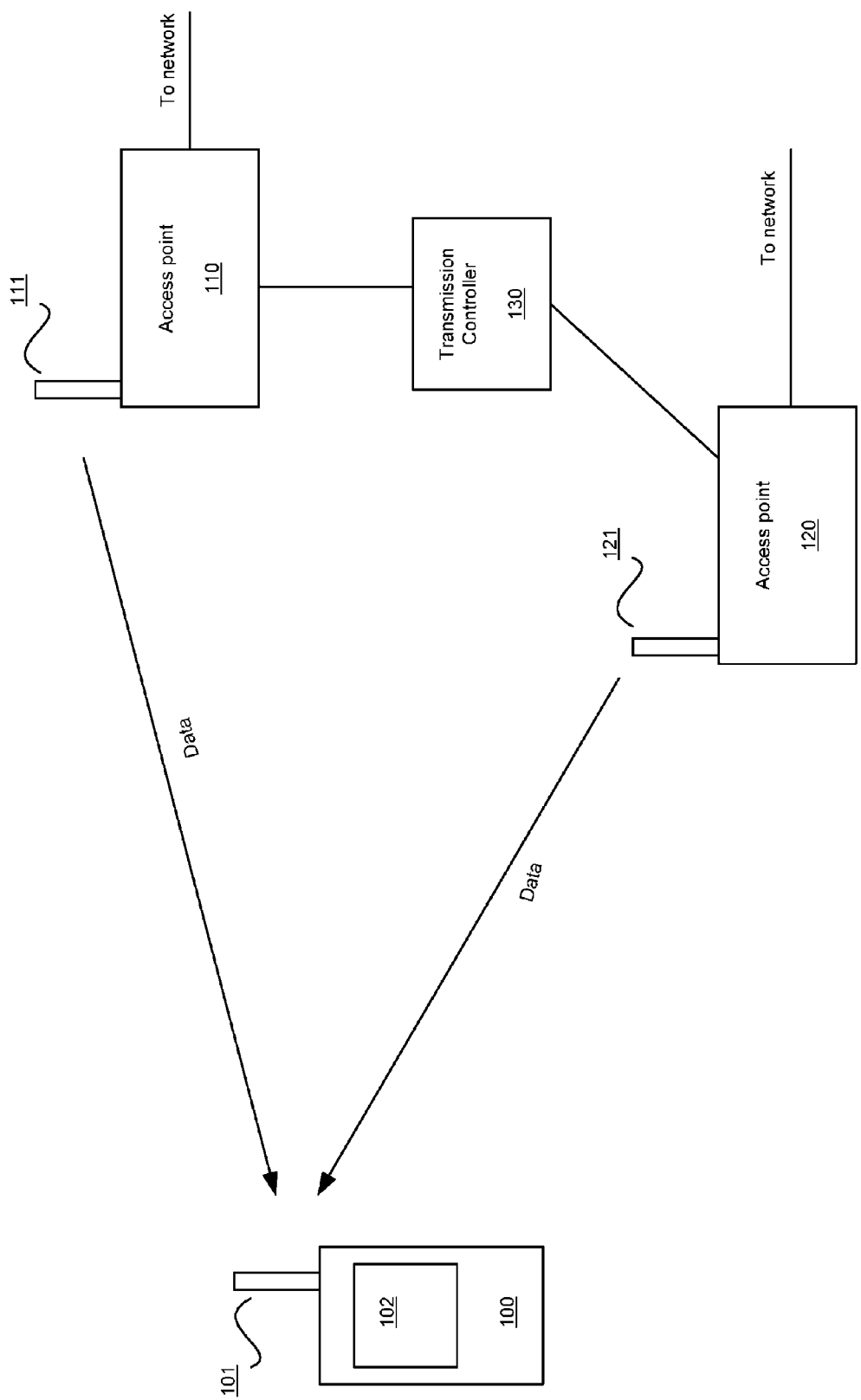
FIG. 1A is a diagram of an exemplary system for transmitting multimedia information from a plurality of access points, in accordance with an embodiment of the invention.

FIG. 1A is a diagram of an exemplary system for transmitting multimedia information from a plurality of access points, in accordance with an embodiment of the invention. Referring to FIG. 1A, there is shown a mobile terminal 100, access points 110 . . . 120, and a transmission controller 130. The mobile terminal 100 may comprise suitable logic, circuitry, and/or code that may enable reception and display of multimedia information, such as, for example, streaming video. The mobile terminal 100 may comprise an antenna 101 and a video display 102.

Each of the access points 110 . . . 120 may comprise suitable logic, circuitry, and/or code that may enable transmission of a multimedia file from a network. For example, the access points 110 . . . 120 may receive streaming video from the network, and the access points 110 . . . 120 may transmit multimedia information to, for example, the mobile terminal 100. The transmission controller 130 may comprise suitable logic, circuitry, and/or code that may enable apportioning of multimedia information that may be transmitted by the access points 110 . . . 120.

In operation, the mobile terminal 100 may request downloading of a multimedia file, for example, a video file, from a network node via the access points 110 . . . 120. At least one of the access points 110 . . . 120 may receive via the network the requested multimedia file as a streaming video. The transmission controller 130 may determine which of the access points 110 . . . 120 may transmit which portion of the streaming video. For example, the transmission controller 130 may indicate that the access point 110 and the access point 120 each transmit the multimedia file. The transmission controller 130 may also indicate that a portion of the video data be transmitted by the access point 110 and the remaining portion by the access point 120.

Accordingly, if the multimedia file is received from the network by the access point 110, the transmission controller 130 may enable communication to the access point 120 of at least those portions of the multimedia file that may need to be transmitted by the access point 120. Other embodiments of the invention may allow a plurality of access points 110 . . . 120 to receive the same multimedia information from the network. Accordingly, the transmission controller 130 may need to communicate to the access points 110 . . . 120 which portions of the received multimedia files to transmit. The mobile terminal 100 may receive the multimedia file transmitted by the access points 110 . . . 120 via the antennas 101, 111 and 121. The multimedia file, which may be, for example, streaming video, may be shown on the display 102. Although the transmission controller 130 may be shown to be separate from the access points 110 . . . 120, the invention need not be so limited. For example, the transmission controller 130 may be part of one of the access points 110 . . . 120.

Figure 1B:
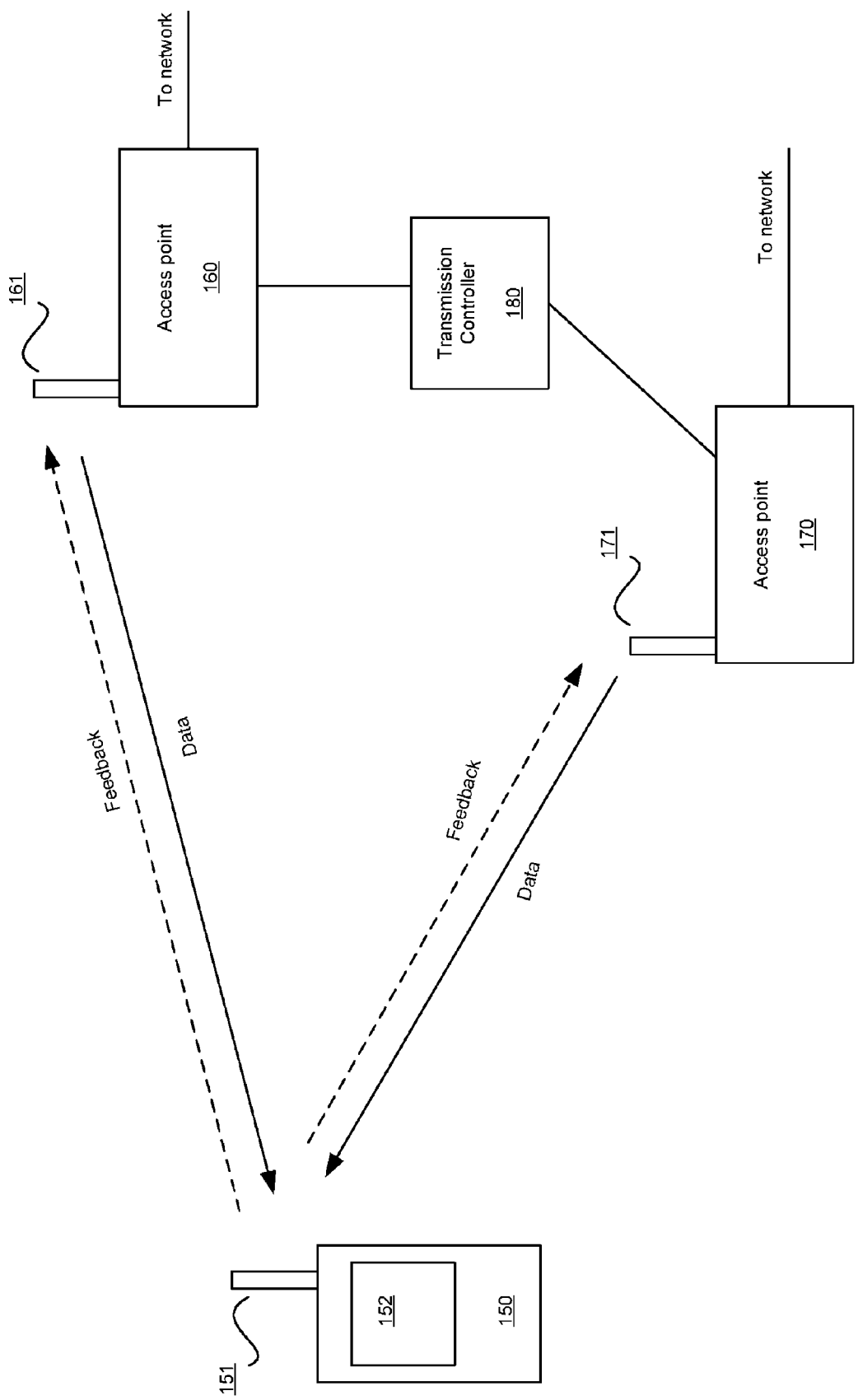
FIG. 1B is a diagram of an exemplary system for transmitting multimedia information from a plurality of access points with feedback to the access points, in accordance with an embodiment of the invention.

FIG. 1B is a diagram of an exemplary system for transmitting multimedia information from a plurality of access points with feedback to the access points, in accordance with an embodiment of the invention. Referring to FIG. 1B, there is shown a mobile terminal 150, access points 160 . . . 170, and the transmission controller 180. The mobile terminal 150 and associated antenna 151 and display 152 may be similar to the mobile terminal 100 and associated antenna 101 and display 102, however, the mobile terminal 150 may also comprise suitable logic, circuitry, and/or code that may enable generation of feedback data for the signals received from each access point 160 . . . 170. The feedback data for each access point 160 . . . 170 from which it received signals may be transmitted to the respective access point 160 . . . 170.

The feedback for each access points 160 . . . 170 may comprise, for example, data regarding error rate of the received signals. Signals from each of the access points 160 . . . 170 may be identified by, for example, an access code that may correspond to each access point. Accordingly, the feedback data for each access point may also be transmitted to the access points 160 . . . 170 where the access code may allow a specific access point to receive the feedback data. The feedback data from the mobile terminal 150 may take into account, for example, error rate for the data received by the mobile terminal 150.

The access points 160 . . . 170 and associated antennas 161 and 171 may be similar to the access points 110 . . . 120 and associated antennas 111 and 121. The access points 160 . . . 170 may also comprise suitable logic, circuitry, and/or code that may enable receiving the feedback data from the mobile terminal 150 and communicating the feedback data to the transmission controller 180. The transmission controller 180 may be similar to the transmission controller 130, and may also comprise suitable logic, circuitry, and/or code that may enable determining transmission of the multimedia file via the access points 160 . . . 170.

For example, the transmission controller 180 may process the feedback information from the mobile terminal 150 to determine how much of the multimedia file may be transmitted by each of the access points 160 . . . 170. For example, if two access points 160 and 170 are available to transmit multimedia information, the transmission controller 180 may determine that both access points 160 and 170 may transmit the same multimedia information. Alternatively, the transmission controller 180 may process the feedback data to determine that each access point 160 and 170 may transmit approximately one-half of the multimedia information. Further, the transmission controller 180 may process the feedback data to determine that one of the access points, for example, the access point 160, may transmit all of the multimedia information, and the other access point, for example, the access point 170, may not transmit any multimedia information. Various embodiments of the invention may utilize different granularities for adjusting the amount of multimedia information that may be transmitted by an access point.

Transmission of multimedia information, for example, video data, may require wide bandwidth, and may need to be optimized as to the amount of data transmitted. Accordingly, data may be compressed prior to transmission to reduce the amount of data that needs to be transmitted. Since errors in the compressed data may lead to inability to decompress the data or to give a result that may affect the decompressed data adversely, data protection methods may be used to enable correction of detected errors. Data protection methods may differ in the number of extra bits that may be used for error detection and correction. Generally, the more bits that are used, the more the data may be protected from uncorrectable errors. However, the extra bits may also reduce throughput of the data.

Accordingly, the transmission controller 180 may indicate, for example, data protection method for use by each of the access points 160 . . . 170. For example, if the feedback data for the access point 160 indicates that there is very little corruption of data transmitted by the access point 160, the transmission controller 180 may indicate use of data protection method that may have relatively few extra bits for data protection. However, if the mobile terminal 150 indicates via the feedback data that data transmitted by the access point 160 is increasingly corrupted, the transmission controller 180 may indicate that the access point 160 use, for example, a half-rate forward error correction method. Accordingly, N bits of multimedia information may be transmitted as 2N bits of data. Another data protection method may be, for example, the ¼ rate forward error correction, where additional overhead may result in 4N bits transmitted for each N bits of multimedia data. Other data protection methods may have different rate of overhead bits. The specific types of nominal and additional forward error correction used may be design and/or implementation dependent.

The transmission controller 180 may also indicate the type of RF modulation to be used for transmission. For example, if the feedback data for the access point 160 indicates that there is very little corruption of data transmitted by the access point 160, the transmission controller 180 may indicate an RF modulation type to increase the number of bits per transmitted symbol. As the level of received data corruption increases, the transmission controller 180 may indicate an RF modulation type that may reduce the number of bits per transmitted symbol to increase the likelihood that a receiving device may recover the transmitted information. Two exemplary modulation methods, quadrature phase-shift keying (QPSK) and 16-state quadrature amplitude modulation (16-QAM), are described with respect to FIGS. 3A and 3B.

Other exemplary modulation types may comprise binary phase shift keying (BPSK), 64 level QAM (64-QAM), and 256 level QAM (256-QAM). For the BPSK modulation type, the number of coded bits associated with a symbol may be represented: $b_{sym}[f_k]=1$, for each frequency carrier $f_k$. For the QPSK modulation type, the number of coded bits associated with a symbol may be represented: $b_{sym}[f_k]=2$, for each frequency carrier $f_k$. For the 16-QAM modulation type, the number of coded bits associated with a symbol may be represented: $b_{sym}[f_k]=4$, for each frequency carrier $f_k$. For the 64-QAM modulation type, the number of coded bits associated with a symbol may be represented: $b_{sym}[f_k]=6$, for each frequency carrier $f_k$. For the 256-QAM modulation type, the number of coded bits associated with a symbol may be represented: $b_{sym}[f_k]=8$, for each frequency carrier $f_k$.

The spatial stream of transmitted symbols may comprise a plurality of frequency carriers, $N_{SD}$, for example a 20 MHz RF channel may comprise $N_{SD}=56$ frequency carriers, $f_{-28}$, $f_{-27}$, . . . , $f_{-1}$, $f_1$, . . . , $f_{27}$, and $f_{28}$, that may be utilized for transmitting coded bits, while a 40 MHz RF channel may comprise $N_{SD}=112$ frequency carriers, $f_{-56}$, $f_{-55}$, . . . , $f_{-1}$, $f_1$ . . . $f_{55}$, and $f_{56}$, that may be utilized for transmitting coded bits. In a MIMO system, the symbols sym[$f_{-28}$], sym[$f_{-1}$], sym[$f_1$], . . . , sym[$f_{27}$], and sym[$f_{28}$], or sym[$f_{-56}$], sym[$f_{-55}$], . . . , sym[$f_{-1}$], sym[$f_1$], . . . , sym[$f_{55}$], and sym[$f_{56}$], may be collectively referred to as an orthogonal frequency division multiplexing (OFDM) symbol. The number of coded bits associated with an OFDM symbol, $N_{CBPS}=N_{SD}*b_{sym}[f_k]$. The number of data bits associated with the OFDM symbol, $N_{DBPS}=R*N_{SD}*b_{sym}[f_k]$, where R may refer to the coding rate.

Various transmission methods are discussed in U.S. application Ser. No. 11/492,391 and the U.S. application Ser. No. 11/492,721, each of which is hereby incorporated herein by reference in its entirety.

Additionally, the transmission controller 180 may assign different priority to different portions of the multimedia information, such as video, audio, or data content, where the priority may be used to determine the data protection method used to protect the specific portions of the multimedia information. This may be referred to as content-aware mapping/error protection. The transmission controller 180 may also use the content-aware mapping/error protection to determine which access point 160 . . . 170 may transmit which portions of the multimedia information. The content-aware mapping/error protection method is discussed in U.S. application Ser. No. 11/492,667, which is hereby incorporated herein by reference in its entirety.

Even in cases where feedback information may not be available from, for example, the mobile terminal 150, channel estimation using communication received from the mobile terminal 150 by each access point may be used to select appropriate data protection, content-aware mapping/error protection, access point allocation, and/or RF modulation type. For example, the received communication may be packets transmitted to the network via the access points 160 . . . 170.

Figure 1C:
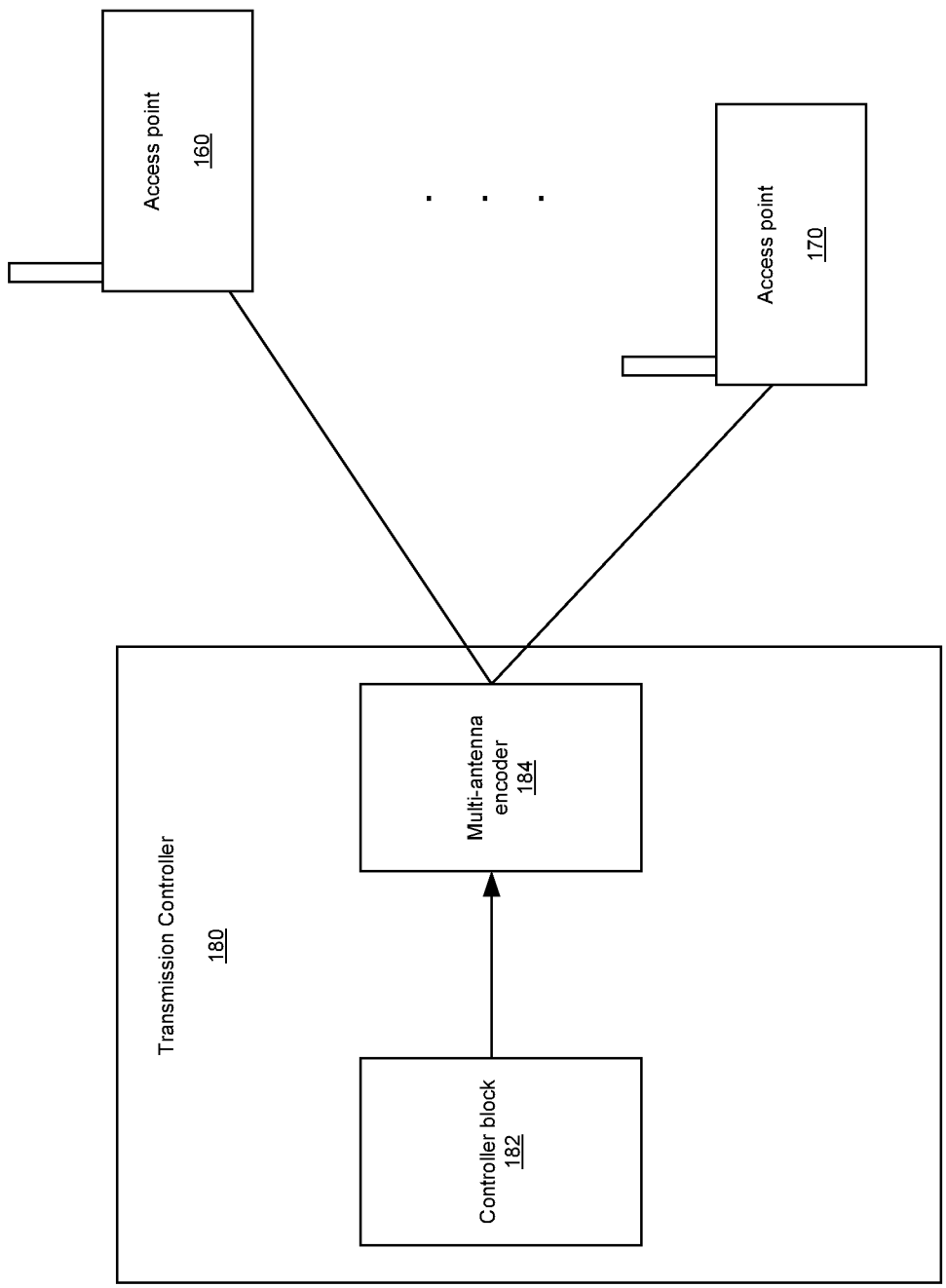
FIG. 1C is a diagram of an exemplary multi-antenna transmission controller, in accordance with an embodiment of the invention.

FIG. 1C is a diagram of an exemplary multi-antenna transmission controller, in accordance with an embodiment of the invention. Referring to FIG. 1C, there is shown the transmission controller 180 that comprises a controller block 182, a multi-antenna encoder block 184, and the plurality of access points 160 . . . 170. The controller block 182 may comprise suitable logic, circuitry, and/or code that may enable determining how portions of a multimedia file may be transmitted via a plurality of antenna. The multi-antenna encoder block 184 may comprise suitable logic, circuitry, and/or code that may enable encoding multimedia information for multi-antenna transmission. Multi-antenna transmission may comprise, for example, multiple input multiple output (MIMO) transmission and/or space-time block code transmission. The various methods of data protection, data modulation, partitioning among a plurality of access points, and/or transmission discussed with respect to FIGS. 1A and 1B may be used for multi-antenna transmission.

In operation, multimedia file may be received by the transmission controller 180. The controller block 182 may determine how the multimedia file may be partitioned, if at all, among, for example, the plurality of access points 160 . . . 170. The controller block 182 may communicate the type of multi-antenna transmission to the multi-antenna encoder block 184. For example, the controller block 182 may indicate that the multimedia file may be equally apportioned for transmission to the access point 160 and the access point 170. The controller block 182 may also indicate that the multi-antenna encoder block 184 use half-rate forward error correction method for transmission by the access points 160 and 170. Accordingly, the multi-antenna encoder block may encode portions of the multimedia file as indicated by the controller block 182, and may communicate the appropriate portions to the access points 160 and 170. The access points 160 and 170 may modulate the portions of the multimedia file for transmission.

While the transmission controller 180 may have been described as comprising the multi-antenna encoder 184, the invention need not be so limited. For example, the multi-antenna encoder 184 may be at each of the access points 160 . . . 170.

Figure 1D:
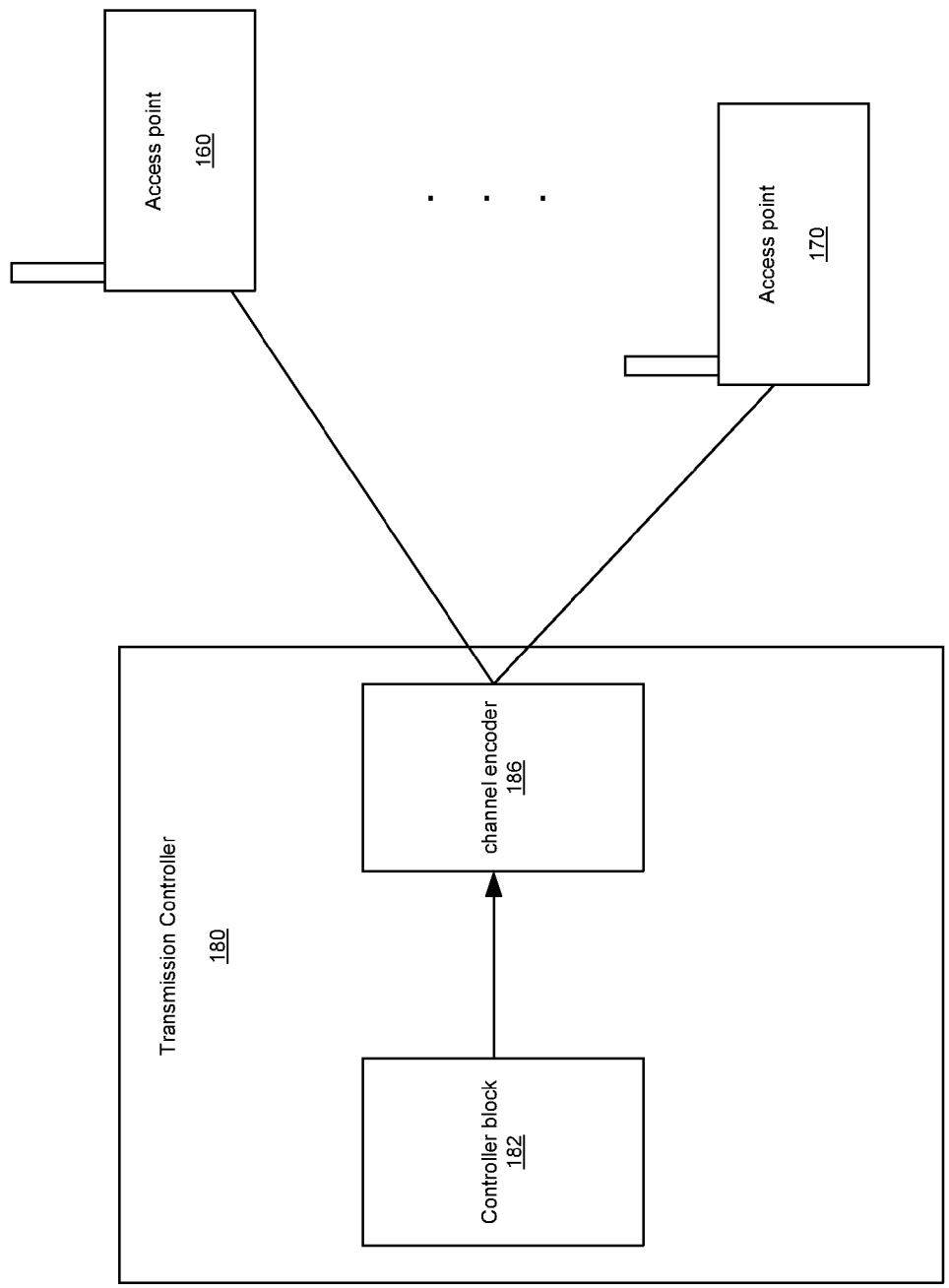
FIG. 1D is a diagram of an exemplary multi-antenna transmission controller, in accordance with an embodiment of the invention.

FIG. 1D is a diagram of an exemplary multi-antenna transmission controller, in accordance with an embodiment of the invention. Referring to FIG. 1D, there is shown the transmission controller 180 that comprises a controller block 182, a channel encoder block 186, and the plurality of access points 160 . . . 170. The controller block 182 may comprise suitable logic, circuitry, and/or code that may enable determining how portions of a multimedia file may be transmitted via a plurality of antennas. The channel encoder block 186 may comprise suitable logic, circuitry, and/or code that may enable encoding multimedia information for multi-antenna transmission. Multi-antenna transmission may comprise, for example, multiple input multiple output (MIMO) transmission and/or space-time block code transmission. The various methods of data protection, data modulation, partitioning among a plurality of access points, and/or transmission discussed with respect to FIGS. 1A and 1B may be used for multi-antenna transmission.

The controller block 182 may, for example, receive feedback information from the mobile terminal 150 via the access point 160 . . . 170. The controller block 182 may process the feedback data and may determine portions of the multimedia information that may be transmitted, and how the multimedia information portions may be transmitted by each of the access points 160 . . . 170. For example, the controller block 182 may be processed to determine that the RF channel from the access point 160 may be a better channel with respect to transmission to the mobile terminal 150 than the access point 170. Accordingly, the controller block 182 may determine that a stronger forward error correction (FEC) method may be used for the access point 170. This may increase the transmission overhead for the access point 170 with respect to the access point 160. However, this may allow the mobile terminal 150 to receive multimedia information from the access point 170 with lower bit error rate than if a weaker FEC with fewer overhead bits is used. The channel encoder block 186 may, for example, encode the multimedia information with FEC.

As an example, if the multimedia information comprises MPEG data with I, B, and P frames, the controller block 182 may determine that I and P frames may be transmitted by the access point 160 where the RF channel to the mobile terminal 150 may be deemed to be better than the access point 170. The controller block 182 may further determine that the access point 170 may transmit the B frames. The controller block 182 may also indicate to the access points 160 . . . 170 the type of modulation to use. For example, the access point 160 may use 16-QAM while the access point 170 may use QPSK.

Accordingly, the controller block 182 may determine, for example, portions of the multimedia information that may be transmitted via different access points 160 . . . 170. The determination may be based on the feedback information from the mobile terminal 150 that may indicate RF channel integrity from the access points 160 . . . 170 to the mobile terminal 150. The determination may also be based on the FEC and modulation being used by the access points 160 . . . 170.

Figure 2:
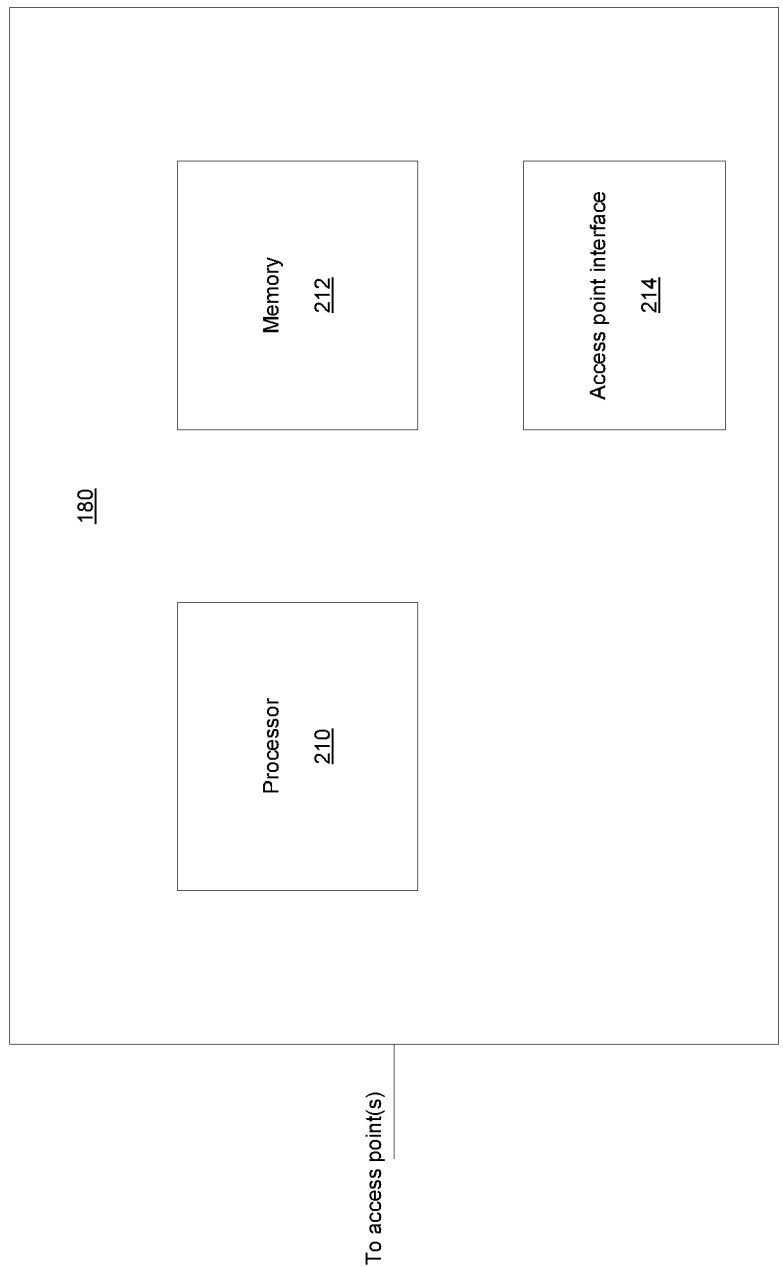
FIG. 2 is a block diagram of an exemplary transmission controller, in accordance with an embodiment of the invention.

FIG. 2 is a block diagram of an exemplary transmission controller, in accordance with an embodiment of the invention. Referring to FIG. 2, there is shown the transmission controller 180 comprising a processor 210, a memory block 212, and an access point interface 214. The access point interface 214 may comprise suitable logic, circuitry, and/or code that may enable communication of data between the transmission controller 180 and, for example, the access points 160 . . . 170.

In operation, the access point interface 214 may receive feedback data from, for example, the access points 160 and/or 170. The feedback data may be stored in the memory block 212 where the processor 210 may be able to access the feedback data corresponding to each of the access points 160 and 170. The processor 210 may then process the feedback data, for example, for the past second for each of the access points 160 and 170. Accordingly, the processor 210 may be able to determine appropriate data protection, content-aware mapping/error protection, access point allocation, and/or RF modulation type for each access point 160 and 170. The two access points 160 and 170 may then transmit portions of the multimedia file as determined by the processor 210.

Although two access points may have been described for transmission of multimedia files, the invention need not be so limited. For example, three access points, four access points or more may be used to transmit multimedia files to a mobile terminal.

Also, although an embodiment of the invention may show, for example, the transmission controller 180 communicating with the access points 160 . . . 170, the invention need not be so limited. For example, the access points may communicate directly with each other to, for example, transfer portions of a multimedia file from one access point to another. Accordingly, the transmission controller 180 may indicate to, for example, the access point 160 which portions of the multimedia file may be communicated to the access point 170. For example, if the access points 160 and 170 are to transmit the same multimedia file, and the access point 170 is not receiving the multimedia file from the network, the transmission controller 180 may indicate to the access point 160 to transmit packets for the multimedia file to the access point 170.

Figure 3:
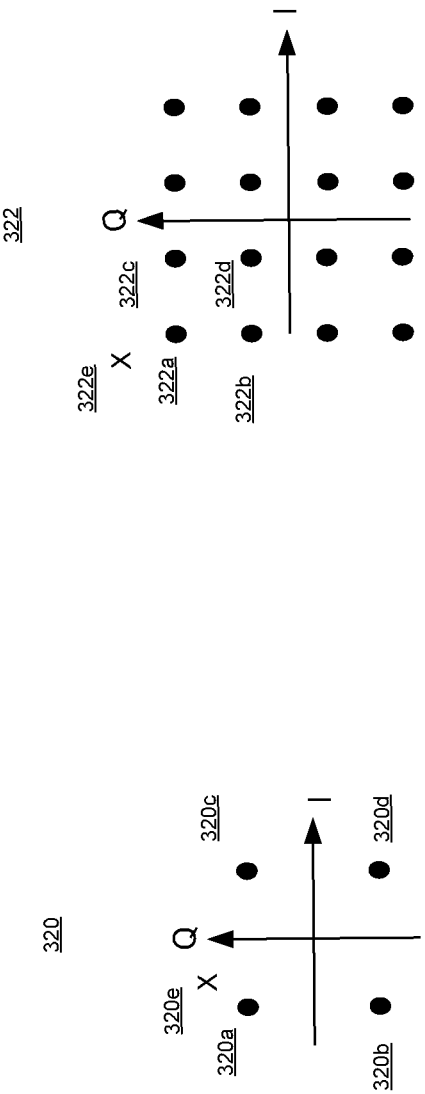
FIG. 3A illustrates an exemplary constellation with four constellation points, which may be utilized in connection with an embodiment of the invention.
FIG. 3B illustrates an exemplary constellation with 16 constellation points, which may be utilized in connection with an embodiment of the invention.

FIG. 3A illustrates an exemplary constellation with four constellation points, which may be utilized in connection with an embodiment of the invention. Referring to FIG. 3A, there is shown a constellation 320 with four constellation points 320a, 320b, 320c, and 320d, and a symbol 320e. QPSK modulated RF signals may be received by, for example, the mobile terminal 101 and may be demodulated and processed to generate a baseband signal. The resulting signals may be mapped to one of the four constellation points.

In one aspect of the invention, each symbol of a demodulated signal may be mapped directly to one of the four constellation points. However, because of noise in the propagation path, and interference from other RF sources, among other factors, a symbol may not be able to be mapped directly to a constellation point. For example, the symbol 320e may need to be mapped. Accordingly, the mobile terminal 101 may try to map the symbol 320e to, for example, the constellation point closest to the symbol. Since the symbol 320e is the closest to the constellation point 320a, the symbol 320e may be mapped to the constellation point 320a.

With respect to FIG. 3A, since there may only be four possibilities for mapping, the likelihood of error may be less than if there were more than four constellation points. For example, 16-QAM modulation as illustrated with respect to FIG. 3B may comprise 16 constellation points. Accordingly, for a given propagation path, data transmitted using the QPSK modulation may allow fewer errors than, for example, data transmitted using the 16-QAM modulation.

FIG. 3B illustrates an exemplary constellation with 16 constellation points, which may be utilized in connection with an embodiment of the invention. Referring to FIG. 3B, there is shown a constellation 322 with 16 constellation points and a symbol 322e. Four of these 16 constellation points are labeled 322a, 322b, 322c, and 322d. The mobile terminal 101, for example, may receive 16-QAM modulated RF signals. The RF signal may be demodulated and processed to generate a baseband signal. The resulting symbols may be mapped to one of the 16 constellation points.

In one aspect of the invention, each symbol of a demodulated signal may map directly to one of the 16 constellation points. However, because of noise in the propagation path, and interference from other RF sources, among other factors, a symbol may not be able to be mapped directly to a constellation point. For example, the symbol 322e may need to be mapped to a symbol. Accordingly, the mobile terminal 101 may try to map the symbol 320e to, for example, the constellation point closest to the symbol. Since the symbol 322e is the closest to the constellation point 322a, the symbol 322e may be mapped to the constellation point 322a.

With respect to FIG. 3B, since there may be 16 possibilities for mapping, the likelihood of error may be greater than if there were less than 16 constellation points. For example, QPSK modulation as illustrated with respect to FIG. 3A may comprise four constellation points. Accordingly, for a given propagation path, data transmitted using the 16-QAM modulation may have more errors than, for example, data transmitted using the QPSK modulation.

Figure 4:
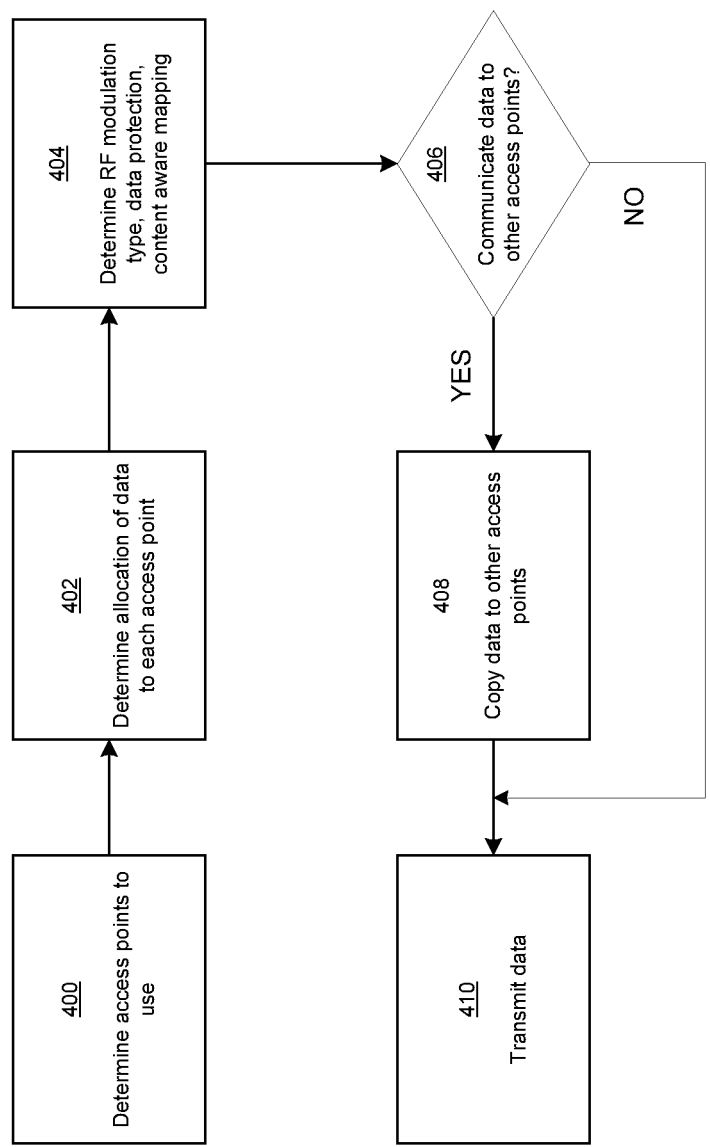
FIG. 4 is a flow chart illustrating exemplary steps for transmitting multimedia information from a plurality of access points without feedback, in accordance with an embodiment of the invention.

FIG. 4 is a flow chart illustrating exemplary steps for transmitting multimedia information from a plurality of access points without feedback, in accordance with an embodiment of the invention. Referring to FIG. 4, there is shown steps 400 to 410. In step 400 the transmission controller 130 may determine which access points may be used. For example, a default usage may select two access points 110 and 120 at random from a plurality of access points 110 . . . 120. In step 402, the transmission controller 130 may allocate portions of a multimedia file that may be transmitted by each access point 110 and 120. This may be, for example, a default usage. For example, each access point 110 and 120 may both transmit the multimedia file such that the mobile terminal 100 may receive redundant signals. Accordingly, the mobile terminal 100 may sum the redundant signals to effectively receive a stronger signal.

In step 404, the transmission controller 130 may determine the type of RF modulation, the type of data protection, and any content aware mapping to use for transmission. Any of these may be set to a default value. An exemplary default setting may be 16-QAM for RF modulation, ½ rate forward error correction for the data protection type, and there may be no content aware mapping. The transmission controller 130 may communicate these selections to the access points 110 and 120.

The access points 110 and 120 may synchronize to the mobile terminal 100 with respect to the transmission parameters selected by the transmission controller 130. The synchronization may occur, for example, by the access points 110 and/or 120 transmitting in a default communication mode to the mobile terminal 100. For example, the default communication mode may be the IEEE 802.11g standard. Accordingly, the mobile terminal 100 may be able to receive multimedia information signals transmitted by the access points 110 and 120.

In step 406, the transmission controller 130 may determine whether a multimedia file may be received from the network by the access points 110 and 120. If so, the next step may be step 410. Otherwise, the next step may be step 408. In step 408, the access point 110 may communicate a copy of multimedia file packets received from the network to the access point 120, where the packets communicated may depend on what the transmission controller 130 indicated to the access point 110. This may occur, for example, because the access point 120 may not have access to the network, or because the access point 120 may not be set up to receive the multimedia file from the network. In step 410, the access points 110 and 120 may transmit the multimedia file to the mobile terminal 100.

Figure 5:
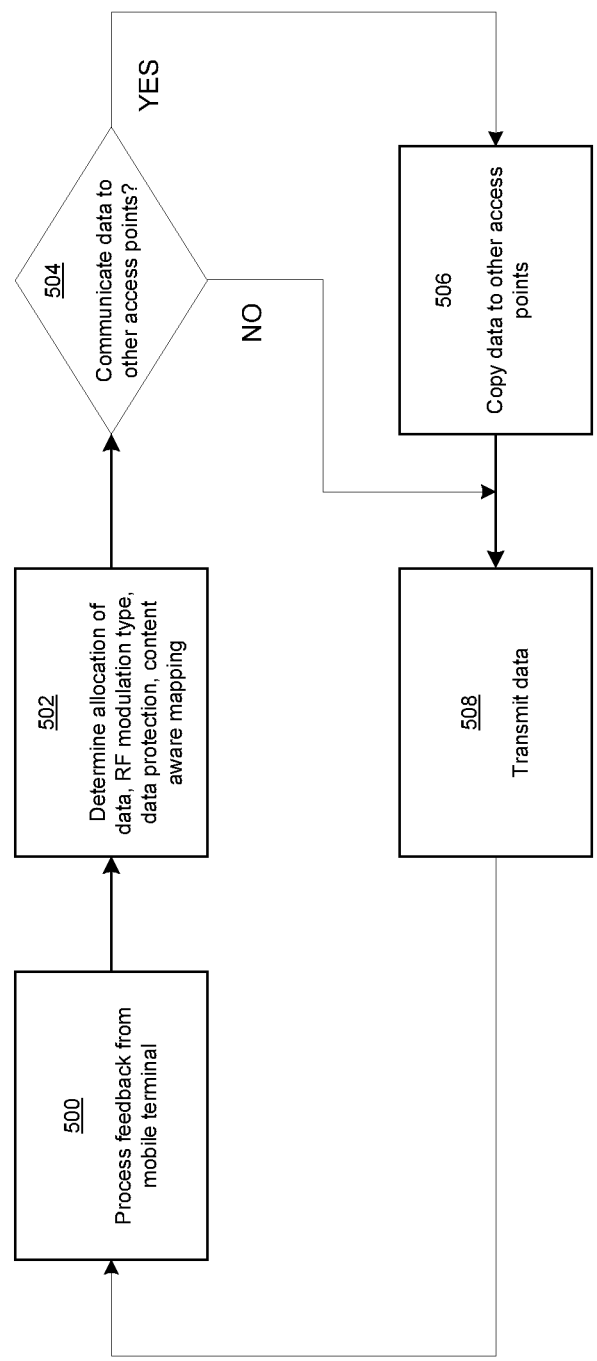
FIG. 5 is a flow chart illustrating exemplary steps for transmitting multimedia information from a plurality of access points with feedback, in accordance with an embodiment of the invention.

FIG. 5 is a flow chart illustrating exemplary steps for transmitting multimedia information from a plurality of access points with feedback, in accordance with an embodiment of the invention. Referring to FIG. 5, there is shown steps 500 to 508. In step 500, the transmission controller 180 may process feedback data from the mobile terminal 150. Alternatively, if there is no feedback available from the mobile terminal 150, the transmission controller 180 may determine channel integrity of signals received from the mobile terminal 150. Channel integrity may, for example, be related to a bit error rate for the received signals. For example, a higher bit error rate may be deemed to have lower channel integrity than a lower bit error rate.

In step 502 the transmission controller 180 may determine which access points may be used. For example, two access points 160 and 170 may be used from the plurality of access points 160 . . . 170 available. This may be, for example, a default usage. The transmission controller 180 may allocate portions of a multimedia file that may be transmitted by each access point 160 and 170 depending on the feedback data.

For example, if the feedback data indicates that transmission by the access point 160 may not be corrupted, while the transmission by the access point 170 may be very corrupted, the transmission controller 180 may allocate the access point 160 for most of the multimedia information to be transmitted. The transmission controller 180 may also indicate that the access point 160 may use a low overhead data protection scheme while selecting a high overhead data protection scheme for the access point 170. Also, the RF modulation type for the access point 160 may be 16-QAM while the RF modulation type for the access point 170 may be QPSK. There may also be content aware mapping for the multimedia information to be transmitted to the mobile terminal 150. The apportioning of the multimedia file may be dynamically adjusted depending on the feedback data and/or the determination of channel integrity for each of the access points that may be transmitting portions of the multimedia file.

The access points 160 and 170 may synchronize to the mobile terminal 150 with respect to the transmission parameters selected by the transmission controller 180. The synchronization may occur, for example, by the access points 160 and/or 170 transmitting in a default communication mode to the mobile terminal 150. For example, the default communication mode may be the IEEE 802.11g standard. Accordingly, the mobile terminal 150 may be able to receive multimedia information signals transmitted by the access points 160 and 170.

Once the access points 160 and 170 are transmitting to the mobile terminal 150, further synchronization may be needed if the transmission controller 180 changes the transmission scheme at a later time. Accordingly, the access points 160 and/or 170 may transmit the new transmission parameters to be used to the mobile terminal 150 before using the new transmission parameters indicated by the transmission controller 180.

If the access points 160 and 170 are selected for transmission to the mobile terminal 150, there may be occasions where the access point 160 may be configured to transmit all of the multimedia information. In such occasions, in order to receive feedback for the transmission path corresponding to the access point 170, the access point 170 may transmit a probing signal, where the access point 160 may be using a different RF channel than the access point 170. However, the invention need not be so limited. For example, an embodiment of the invention may time-multiplex the transmission by the access points 160 and 170 such that both access points may transmit using the same RF channel.

In step 504, the transmission controller 180 may determine whether a multimedia file may be received from the network by the access points 160 and 170. If so, the next step may be step 508. Otherwise, the next step may be step 506. In step 506, the access point 160 may communicate a copy of each multimedia file packet received from the network to the access point 170. This may occur, for example, because the access point 170 may not have access to the network, or because the access point 170 may not be set up to receive the multimedia file from the network. The access point 160 may communicate packets to the access point 170 as indicated by the transmission controller 180. In step 508, the access points 160 and 170 may transmit the multimedia file to the mobile terminal 150.

In accordance with an embodiment of the invention, aspects of an exemplary system may comprise a transmission controller device, for example, the transmission controller 180, which may apportion multimedia information among a plurality of access points, for example, the access points 160 . . . 170. For example, the multimedia information may comprise video information, audio information, and/or data. The access points 160 . . . 170 may transmit the apportioned multimedia information to at least one receiving device, for example, the mobile terminal 150.

The mobile terminal 150 may generate a feedback channel information for each access point 160 . . . 170 from the multimedia information transmitted by the respective access point. Any of the access points 160 . . . 170 that may not be apportioned multimedia information may transmit a probing signal, and the probing signal may be used by the mobile terminal 150 to generate the feedback channel information for the respective access point transmitting the probing signal. The feedback channel information may be transmitted by the mobile terminal 150, and the feedback channel information may be used by the transmission controller 180 to dynamically adjust apportioning of the multimedia information. For example, the transmission controller 180 may indicate changing the forward error correction and/or RF modulation scheme.

The transmission controller 180 may be integrated into one of the access points 160 . . . 170, or the transmission controller 180 may be a separate device. The transmission controller 180 may determine priority for at least a portion of the multimedia information based on the received feedback channel information. The priority may be used to determine a forward correction code that may be used for transmitting the apportioned multimedia information. The priority may also be used to determine a RF modulation scheme to apply to the multimedia information. The access points 160 . . . 170 may each transmit using one of a plurality of different RF channels.

Although various embodiments of the invention may have described the receiving device as a mobile terminal, the invention need not be limited to transmitting to mobile terminals. For example, a television set or a personal computer that is normally located in one location may also be the receiving device.

Another embodiment of the invention may provide a machine-readable medium, having stored thereon, a computer program having at least one code section executable by a machine, thereby causing the machine to perform the steps as described above for distributed infrastructure for streaming data via multiple access points.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method comprising:
communicating between a controller and a plurality of transmitting devices to transmit data from the plurality of transmitting devices to a destination device;
determining, by use of the controller, at least two of the plurality of transmitting devices that are to transmit the data to the destination device;
determining, by use of the controller, amounts of the data to be sent by respective transmitting devices determined for use in transmitting the data to the destination device;
separating the data into respective different portions for transmission from the respective transmitting devices to the destination device;

transmitting the respective different portions of the data from the respective transmitting devices to the destination device;
receiving, at least at one of the transmitting devices, feedback information from the destination device that relates to corruption of the data received at the destination device regarding transmission of the data from the respective transmitting devices;
communicating the feedback information to the controller; and
based upon the feedback information:
adjusting respective amounts of data subsequently transmitted from the respective transmitting devices to the destination device;
adjusting a priority used in transmitting the data; and
adjusting a type of data protection used in transmitting the data.

2. The method of claim 1, wherein the type of data protection comprises at least one of content-aware mapping/error protection and block coding.

3. The method of claim 1, wherein the priority is used to determine a data protection type used in transmitting the data.

4. The method of claim 1, wherein the respective different portions of the data comprising differing types of multimedia content.

5. The method of claim 1, wherein the respective different portions of the data comprise overlapping portions of the data.

6. The method of claim 1, further comprising using the feedback information to dynamically adjust radio frequency modulation for transmission at one or more of the respective transmitting devices.

7. The method of claim 1, wherein:
the data comprises multimedia data; and
different data protection is used for different types of the multimedia data.

8. The method of claim 1, wherein the feedback information further relates to service available from a transmit device not currently servicing transmission of the data.

9. A method comprising:
communicating between a controller and a first transmitting device and a second transmitting device to transmit multimedia data from the first and second transmitting devices to a destination device;
determining, by use of the controller, amounts of the multimedia data to be sent respectively by the first and second transmitting devices in transmitting the multimedia data to the destination device;
separating the multimedia data into respective different portions for transmission from the first and second transmitting devices to the destination device;
transmitting the respective different portions amount of the multimedia data from the first and second transmitting devices to the destination device;
receiving, at least at one of the transmitting devices, feedback information from the destination device that relates to corruption of the multimedia data received at the destination device regarding transmission of the multimedia data from the first and second transmitting devices;
communicating the feedback information to the controller; and
based upon the feedback information:
adjusting respective amounts of multimedia data subsequently transmitted from the first and second transmitting devices to the destination device;
adjusting a priority used in transmitting the multimedia data; and
adjusting a type of data protection used in transmitting the multimedia data.

10. The method of claim 9, wherein the type of data protection comprises at least one of content-aware mapping/error protection and block coding.

11. The method of claim 9, wherein the priority is used to determine a data protection type used in transmitting the data.

12. The method of claim 9, wherein the respective different portions of the multimedia data comprising differing types of multimedia data.

13. The method of claim 9, wherein the respective different portions of the multimedia data comprise overlapping portions of the multimedia data.

14. The method of claim 9, further comprising using the feedback information to dynamically adjust radio frequency modulation for transmission at one or more of the transmitting devices.

15. The method of claim 9, wherein different data protection is used for different types of the multimedia data.

16. The method of claim 9, wherein the feedback information further relates to service available from a third transmit device.

17. An apparatus comprising:
a processor configured to:
determine at least two of a plurality of transmitting devices that are to transmit data to a destination device;
determine amounts of the data that is to be sent by respective transmitting devices determined for use in transmitting the data to the destination device;
separate the data into respective different portions for transmission from the respective transmitting devices to the destination device; and
cause the respective different portions of the data to be transmitted to the destination device from the respective transmitting devices; and
process feedback information received at one or more of the transmitting devices, in which the feedback information from the destination device relates to corruption of the data received at the destination device regarding transmission of the data from the respective transmitting devices to:
adjust respective amounts of data subsequently transmitted from the respective transmitting devices to the destination device;
dynamically adjust a priority used in transmitting the data; and
dynamically adjust a type of data protection used in transmitting the data; and
an interface circuit, coupled to the processor, to communicate with the plurality of transmitting devices to control transmission of the data and to receive the feedback information.

18. The apparatus of claim 17, wherein the type of data protection comprises at least one of content-aware mapping/error protection and block coding.

19. The apparatus of claim 17, wherein the priority is used to determine a data protection type used in transmitting the data.

20. The apparatus of claim 17, wherein the respective different portions of the data comprise overlapping portions of the data.

* * * * *